United States Patent [19]

Gutkowski et al.

[11] Patent Number: 5,226,498

[45] Date of Patent: Jul. 13, 1993

[54] AUTOMOTIVE POWER STEERING GEAR

[75] Inventors: Seth A. Gutkowski; Thomas W. Weisgerber, both of Saginaw, Mich.

[73] Assignee: General Motors Corporation, Detroit, Mich.

[21] Appl. No.: 807,316

[22] Filed: Dec. 16, 1991

[51] Int. Cl.[5] .............................................. B62D 5/04
[52] U.S. Cl. ................................ 180/79.1; 74/388 PS
[58] Field of Search .................. 180/79.1; 74/388 PS; 318/2

[56] References Cited

U.S. PATENT DOCUMENTS

| | | | |
|---|---|---|---|
| 4,437,531 | 3/1984 | Urabe | 180/79.1 |
| 4,771,846 | 9/1988 | Venable et al. | 180/142 |
| 4,886,137 | 12/1989 | Pawlak et al. | 180/142 |
| 4,886,138 | 12/1989 | Graber et al. | 180/142 |

Primary Examiner—Mitchell J. Hill
Attorney, Agent, or Firm—Saul Schwartz

[57] ABSTRACT

An automotive power steering gear has a pair of permanent magnet driving discs supported on a housing of the steering gear and continuously rotated in opposite directions corresponding to right and left turn rotation of an output shaft of the steering gear. A soft, magnetically permeable driving disc is supported on the housing between the driving discs for rotation and for bodily shiftable movement toward and away from respective ones of the driving discs. The driven disc is drivingly connected to the output shaft of the steering gear. When steering effort is applied at a steering wheel connected to an input shaft of the steering gear, a cam and follower apparatus bodily shifts the driven disc toward the one of the driving discs rotating in the direction corresponding to the direction of the applied effort. The rotating magnetic flux field of the driving disc intercepts the driven disc and induces thereon a magnetic steering assist torque in the direction of the applied effort.

9 Claims, 2 Drawing Sheets

AUTOMOTIVE POWER STEERING GEAR

FIELD OF THE INVENTION

This invention relates to automotive power steering gears.

BACKGROUND OF THE INVENTION

Hydraulic power steering gears for automobiles typically include a steering gear housing containing a steering assist fluid motor and a control valve for selectively connecting the motor to a pump. Usually, a torsion bar between input and output members of the steering gear centers the control valve in a neutral position when no steering effort is applied, as in straight-ahead driving, and simulates road feel when a driver applies manual effort to a steering wheel. U.S. Pat. Nos. 4,886,137 and 4,886,138, issued Dec. 12, 1989 and assigned to the assignee of this invention, describe electro-hydraulic power steering gears in which electromagnetic apparatus varies the effect of the torsion bar as a function of vehicle speed to achieve variable effort power steering. Also, power steering gears have been proposed in which an electric motor is the power source for steering assist. An automotive power steering gear according to this invention is a novel alternative to hydraulic, electro-hydraulic and electric power steering gears.

SUMMARY OF THE INVENTION

This invention is a new and improved automotive power steering gear including an output shaft connected to steered wheels of a vehicle, an input shaft connected to a steering wheel, and a spring between the input and output shafts defining a centered position of the input shaft relative to the output shaft when no steering effort is applied and simulating road feel when the input shaft is displaced from its centered position relative to the output shaft in a right or a left turn direction. The steering gear according to this invention further includes a sleeve splined to the output shaft for rotation therewith and for longitudinal bodily movement relative thereto and a cam and follower apparatus on the sleeve and on the input shaft. The cam and follower apparatus locates the sleeve in a neutral position in the centered position of the input shaft and shifts the sleeve longitudinally in opposite directions corresponding to right and left turn displacement of the input shaft from its centered position relative to the output shaft. A pair of permanent magnet driving discs sleeve are constantly driven in opposite directions corresponding right and left turn directions of rotation of the output shaft. Each driving disc has a magnetic flux field which rotates therewith. A driven disc made of non-permanently magnetized soft iron is rigidly connected to the sleeve and located midway between the driving discs in the neutral position of the sleeve. When the driver turns the steering wheel, the cam and follower apparatus shifts the control sleeve longitudinally toward one or the other of the driving discs so that the flux fields rotating therewith intercept the driven disc. Relative movement between the flux field and the driven disc induces eddy currents and magnetic hysteresis in the driven disc which, in turn, induces a steering assist torque on the driven disc in the corresponding direction of rotation of the output shaft.

DESCRIPTION OF PREFERRED EMBODIMENTS

Figure 1:
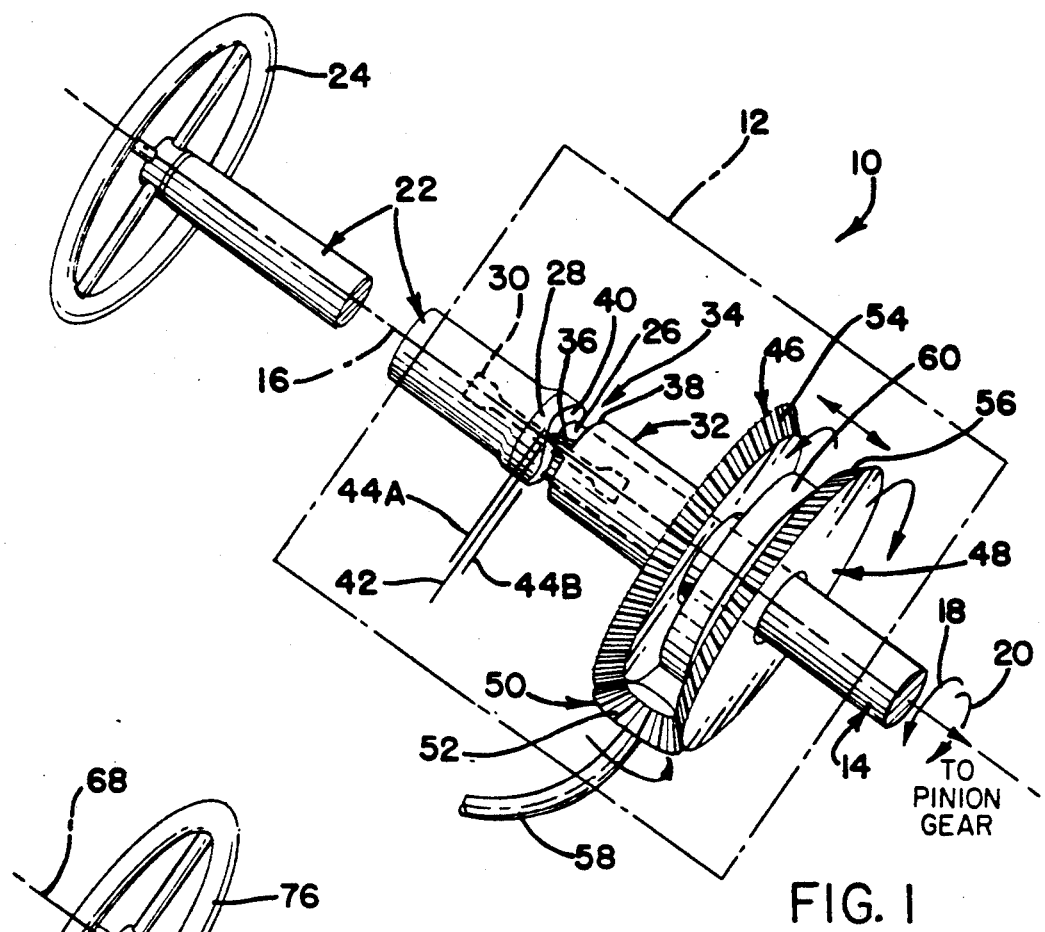
FIG. 1 is a schematic perspective view of a power steering gear according to this invention.

Referring to FIG. 1, an automotive power steering gear (10) according to this invention includes a schematically represented housing or case (12) adapted for rigid attachment to a sprung mass portion of a vehicle, not shown. An output shaft (14) is supported on the case for rotation about an axis (16) in a first direction represented by a direction arrow (18) corresponding to right turn steering and in a second direction represented by a direction arrow (20) corresponding to left turn steering. The output shaft is connected to steered wheels, not shown, of the vehicle through conventional rack and pinion means including a pinion gear on the lower or outboard end of the output shaft.

An input shaft (22) of the steering gear is supported on the case (12) for rotation about the axis (16) in the right and left turn directions independent of the output shaft (14). A steering wheel (24) on an outboard end of the input shaft rotates as a unit with the input shaft. The output shaft (14) may have a tubular end (26) rotatably journaled in a tubular inboard end (28) of the input shaft. A torsion bar (30) is rigidly connected at opposite ends to the input and output shafts inside the tubular portions thereof.

The torsion bar defines a centered position of the input shaft relative to the output shaft when no effort is applied at the steering wheel (24) and simulates road feel by resisting displacement of the input shaft in either the right or left turn direction from its centered position when a driver applies effort at the steering wheel, the level of resistance being proportional to the magnitude of displacement from the centered position. Stops, not shown, on the input and output shafts limit the magnitude of angular displacement of the input shaft from its centered position in both right and left turn directions and insure positive driving connection between the shafts if the integrity of the torsion bar is compromised.

The steering gear (10) further includes a cylindrical sleeve (32) around the output shaft (14) spline-connected thereto for rotation as a unit with the output shaft about the axis (16) and for bodily shiftable movement relative to the output shaft in the direction of the axis (16). A cam and follower apparatus (34) between the sleeve and the input shaft includes a follower (36) on an end (38) of the sleeve (32) and a cylindrical cam (40) on the adjacent end of the input shaft. A spring, not shown, biases the sleeve (32) toward the input shaft to maintain continuous contact between the follower (36) and the cam (40).

The cam and follower apparatus (34) defines a neutral position of the sleeve (32), indicated by a transverse reference line (42), corresponding to the centered position of the input shaft and a range of longitudinal positions on opposite sides of the neutral position corresponding to right and left turn rotation of the input shaft from its centered position. The boundaries of the ranges of longitudinal positions of the sleeve (32) in the right turn and the left turn directions are represented by a pair of transverse reference lines (44A-B), respectively, which boundaries correspond to engagement of the aforesaid input shaft and output shaft limit stops in the right and left turn directions.

The steering gear (10) further includes a first or right turn driving disc (46) and a second or left turn driving disc (48) supported on the steering gear housing (12) for rotation about the axis (16) independent of each other and of the input and output shafts. The driving discs are preferably made of a high energy permanently magnetized material such as Neodymium-based magnets although other permanent magnet materials or combinations of permanent magnet segments attached to the driving discs are contemplated.

A pinion (50) is supported on the steering gear housing for rotation about an axis perpendicular to the axis (16). The pinion (50) is generally between the driving discs (46,48) and has gear teeth on a frustoconical edge (52) drivingly engaging corresponding gear teeth on respective ones of a pair of circumferential edges (54,56) on the driving discs (46,48), respectively. The pinion (50) simultaneously rotates the right turn driving disc in the right turn direction and the left turn driving disc in the left turn direction. A flexible cable (58) between the pinion (50) and, for example, a belt driven pulley on an engine of the vehicle effects continuous unidirectional rotation of the pinion whenever the engine is on.

A driven disc (60), made of non-permanently magnetized soft magnetic material such as iron, is rigidly attached to the sleeve (32) and located midway between the right and left turn driving discs (46,48) in the neutral position of the sleeve. The driven disc (60) is rotatable as a unit with the sleeve (32) and the output shaft (14) and bodily shiftable as a unit with the sleeve (32) in the direction of the axis (16) toward and away from the driving discs. The speed at which the right and left turn driving discs (46,48) are rotated by the pinion (50) about the axis (16) is calculated to exceed the maximum speed at which the driven disc (60) rotates as a unit with the output shaft (14) in either the right or left turn directions about the axis (16).

When the engine of the vehicle is on, the pinion (50) continuously rotates the driving discs (46,48) in the right and left turn directions (18,20), respectively. With the sleeve in its neutral position, i.e. no manual steering input applied at the steering wheel (24), the driven disc (60) is midway between the driving discs and is unaffected or unbiased by the rotating magnetic flux fields of the driving discs.

When a driver applies manual effort at the steering wheel to steer a right turn, for example, the input shaft (22) is angularly displaced from its centered position by an included angle proportional to the effort applied at the steering wheel (24) and resisted by the torsion bar. Concurrently, the cam and follower apparatus (34) effects bodily shiftable movement of the sleeve (32) from its neutral position (42) toward its right turn limit position (44A) and of the driven disc (60) from midway between the driving discs (46,48) toward the right turn driving disc (46).

In that circumstance, the magnetic flux fields rotating with the right turn driving disc (46) intercept the driven disc (60) and induce eddy currents and magnetic hysteresis in the driven disc. The net effect of the eddy currents and magnetic hysteresis and the faster rotation of the driving disc (46) in the right turn direction relative to the driven disc (60) is a magnetic induced torque on the driven disc in the right turn direction. The magnetic induced torque is transferred to the output shaft (14) through the sleeve (32) and the spline connection between the sleeve and the output shaft and thereby provides power assist by supplementing the torque transferred from the input shaft to the output shaft through the torsion bar (30). It is contemplated that steering assist by magnetic induced torque may also be achieved in an embodiment where the magnetic field emanates from the driven disc (60) and the driving discs (46,48) are made of non-permanently magnetized soft magnetic material such as iron.

As long as the driver maintains the angular displacement of the input shaft from its centered position by continuing to apply effort at the steering wheel (24), magnetic induced torque on the driven disc persists. When steering effort ceases, the torsion bar (30) returns the input shaft (22) to its centered position and the cam and follower apparatus (34) returns the sleeve (32) to its neutral position in which the net magnetic induced torque on the driven disc (60) is zero.

Figure 2:
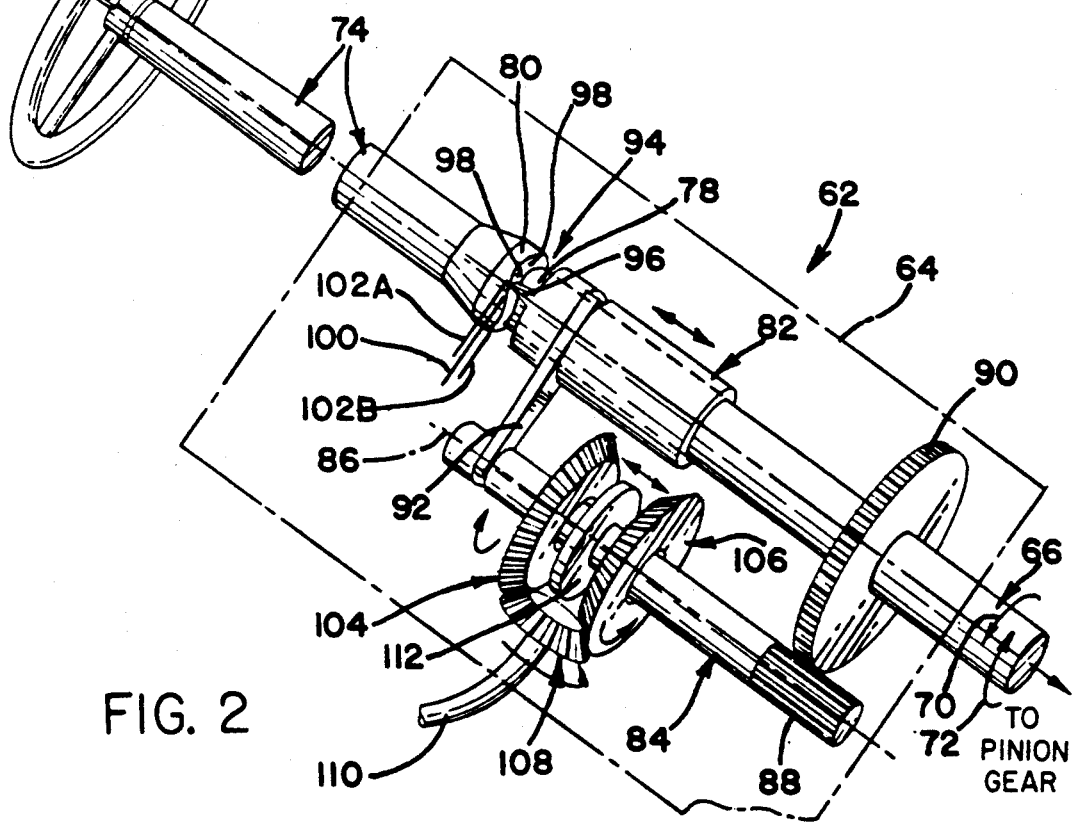
FIG. 2 is similar to FIG. 1 but showing a modified embodiment of the power steering gear according to this invention.

Referring to FIG. 2, a modified power steering gear (62) according to this invention includes a schematically represented housing or case (64) and an output shaft (66) rotatable about an axis (68) of the case (64) in a first direction represented by a direction arrow (70) corresponding to right turn steering and in a second direction represented by a direction arrow (72) corresponding to left turn steering. The output shaft is connected to steered wheels as described above.

An input shaft (74) of the steering gear is supported on the case (64) for rotation about the axis (68) in the right and left turn directions independent of the output shaft (66). A steering wheel (76) on the input shaft rotates as a unit therewith. The output shaft (66) may have a tubular end (78) rotatably journaled in a tubular inboard end (80) of the input shaft. A torsion bar, not shown, is rigidly connected at opposite ends to the input and output shafts inside the tubular portions thereof. The torsion bar defines a centered position of the input shaft relative to the output shaft and simulates road feel.

A cylindrical sleeve (82) around the output shaft (66) is spline-connected thereto for rotation as a unit with the output shaft about the axis (68) and for bodily shiftable movement relative to the output shaft in the direction of the axis (68). A side shaft (84) is supported on the steering gear housing (64) for rotation about a second axis (86) parallel to the axis (68) and for bodily shiftable movement in the direction of the axes (68,86). The side shaft is drivingly connected to the output shaft (66) through reduction gearing including a first gear (88) on the side shaft and a second gear (90) on the output shaft.

An arm (92) has forked ends in grooves in the sleeve and in the side shaft whereby the side shaft (84) is bodily shiftable as a unit with the sleeve (82) in the direction of the axes (68,86). A cam and follower apparatus (94) between the sleeve and the input shaft includes a follower (96) on the sleeve (82) and a cylindrical cam (98) on the input shaft. A spring, not shown, biases the sleeve (82) toward the input shaft to maintain continuous contact between the follower (96) and the cam (98).

The cam and follower apparatus (94) defines a neutral position of the sleeve (82), indicated by a transverse reference line (100), corresponding to the centered position of the input shaft and a range of longitudinal positions on opposite sides of the neutral position corresponding to right and left turn rotation of the input shaft from its centered position. The boundaries of the ranges of longitudinal positions of the sleeve (82) in the right and the left turn directions, respectively, are represented by a pair of transverse reference lines (102A-B).

A first or right turn driving disc (104) and a second or left turn driving disc of the steering gear (106) are supported on the steering gear housing (64) for rotation about the second axis (86) independent of each other and of the side shaft (84). The driving discs are preferably made of a high energy permanently magnetized material as described above but may also be made of non-permanently magnetized soft magnetic material such as iron in an alternate embodiment.

A pinion (108) is supported on the steering gear housing (64) for rotation about an axis perpendicular to the second axis (86). The pinion (108) is generally between the driving discs (104,106) and simultaneously rotates the right turn driving disc in a first direction corresponding to rotation of the output shaft (66) in the right turn direction and the left turn driving disc in a second direction corresponding to rotation of the output shaft (66) in the left turn direction. A flexible cable (110) effects continuous unidirectional rotation of the pinion as described above.

A driven disc (112), is rigidly attached to the side shaft (84) and located midway between the right and left turn driving discs (104,106) in the neutral position of the sleeve (82). The driven disc is preferably made of non-permanently magnetized soft magnetic material such as iron but may be made of high energy permanently magnetized material if the driving discs are non-permanently magnetized. The driven disc (112) is rotatable as a unit with the side shaft and also bodily shiftable as a unit therewith in the direction of the axes (68,86) toward and away from the driving discs. The speed at which the right and left turn driving discs (104,106) are rotated by the pinion (108) is calculated to exceed the maximum speed at which the side shaft (84) rotates when the output shaft rotates in either the right or left turn directions.

The steering gear (62) operates generally as described above with respect to steering gear (10). Relative rotation between the input and output shafts (74,66) shifts the sleeve (82) in the corresponding direction from its neutral position (110) through the cam and follower apparatus (94). Movement of the sleeve (82) in the direction of the axis (68) is accompanied by concurrent bodily shiftable movement of the side shaft (84) in the same direction to move the driven disc (112) closer to one of the left and right turn driving discs (104,106). The corresponding one of the driving discs induces steering assist torque on the driven disc. The steering assist torque is transferred from the driven disc (112) to the output shaft (66) through the side shaft (84) and the reduction gears (88,90).

In that circumstance, the magnetic flux fields rotating with the right turn driving disc (46) intercept the driven disc (60) and induce eddy currents and magnetic hysteresis in the driven disc. The net effect of the eddy currents and magnetic hysteresis and the faster rotation of the driving disc (46) in the right turn direction relative to the driven disc (60) is a magnetic induced torque on the driven disc in the right turn direction. The magnetic induced torque is transferred to the output shaft (14) through the sleeve (32) and the spline connection between the sleeve and the output shaft and thereby provides power assist by supplementing the torque transferred from the input shaft to the output shaft through the torsion bar (30). It is contemplated that magnetic induced torque may also be achieved in an embodiment where the magnetic field emanates from the driven disc (60) and the driving discs (46,48) are made of non-permanently magnetized soft magnetic material such as iron.

Figure 3:
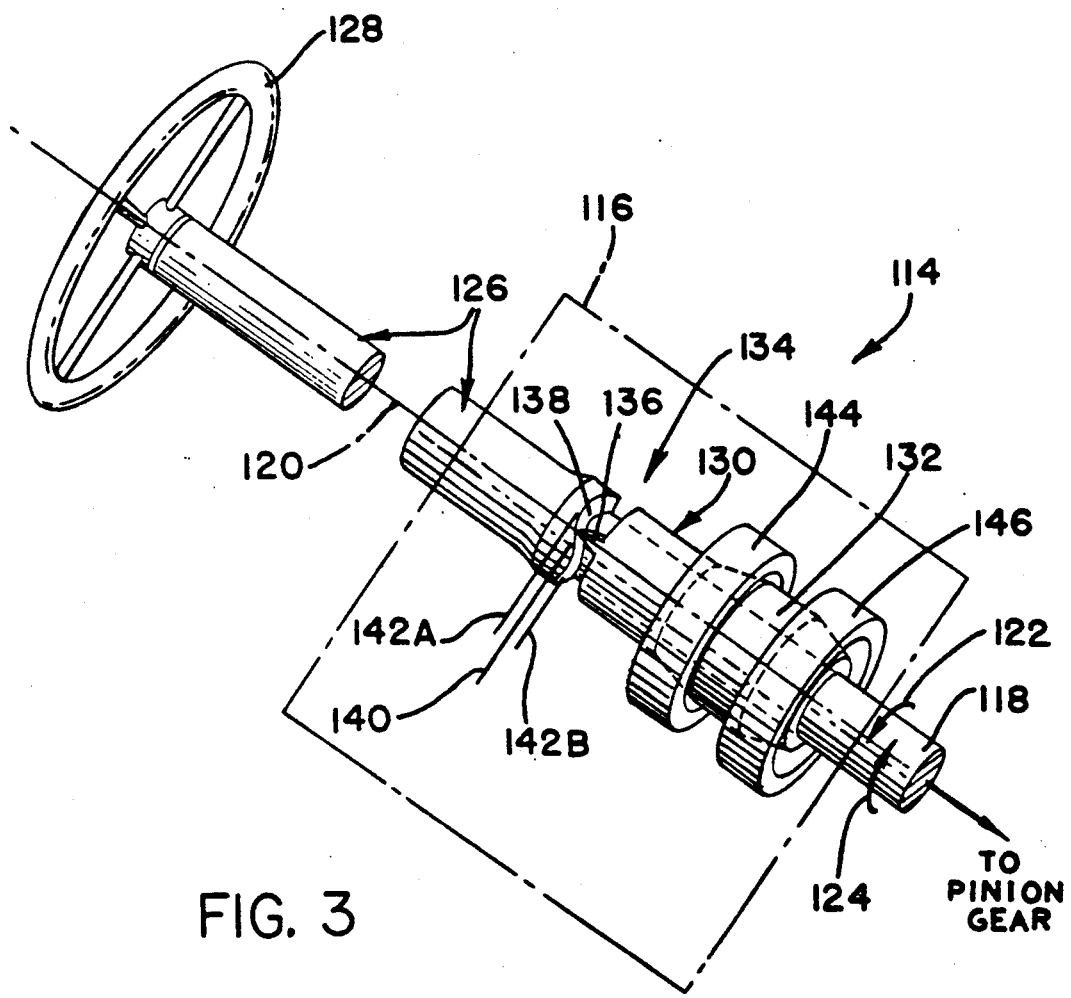
FIG. 3 is similar to FIG. 1 but showing a second modified embodiment of the power steering gear according to this invention.

Referring to FIG. 3, a second modified power steering gear (114) according to this invention includes a schematically represented housing or case (116) and an output shaft (118) rotatable about an axis (120) of the case (116) in a first direction represented by a direction arrow (122) corresponding to right turn steering and in a second direction represented by a direction arrow (124) corresponding to left turn steering. The output shaft is connected to steered wheels as described above.

An input shaft (126) of the steering gear is supported on the case (116) for rotation about the axis (120) in the right and left turn directions independent of the output shaft (118). A steering wheel (128) on the input shaft rotates as a unit therewith. The output shaft (118) may have a tubular end rotatably journaled in a tubular inboard end of the input shaft with a torsion bar, not shown, rigidly connected at opposite ends to the input and output shafts inside the tubular portions. The torsion bar defines a centered position of the input shaft relative to the output shaft and simulates road feel.

A cylindrical sleeve (130) around the output shaft (118) is spline-connected thereto for rotation as a unit with the output shaft about the axis (120) and for bodily shiftable movement relative to the output shaft in the direction of the axis (120). The sleeve has a large diameter cylindrical portion (132) and a pair of frustoconical shoulders on opposite sides of the large diameter portion. In one version of this embodiment, the sleeve is made of non-permanently magnetized soft magnetic material such as iron but may, in an alternate version, be made of high energy permanently magnetized material.

A cam and follower apparatus (134) between the sleeve and the input shaft includes a follower (136) on the sleeve (130) and a cylindrical cam (138) on the input shaft. A spring, not shown, biases the sleeve (130) toward the input shaft to maintain continuous contact between the follower (136) and the cam (138).

The cam and follower apparatus (134) defines a neutral position of the sleeve (130), indicated by a transverse reference line (140), corresponding to the centered position of the input shaft and a range of longitudinal positions on opposite sides of the neutral position corresponding to right and left turn rotation of the input shaft from its centered position. The boundaries of the ranges of longitudinal positions of the sleeve (130) in the right and the left turn directions are represented by a pair of transverse reference lines (142A-B).

A first or right turn driving disc in the form of a cylindrical ring (144) and a second or left turn driving disc in the form of a cylindrical ring (146) are supported on the steering gear housing (116) for rotation about the axis (120) independent of each other. In the aforesaid one version of this embodiment, rings (144-146) are made of a high energy permanently magnetized material as described above but may, in the aforesaid alternate version, be made of non-permanently magnetized soft magnetic material such as iron. The large diameter portion (132) of the sleeve (130) is centered between the cylindrical rings (144-146) in the neutral position of the sleeve (130).

A pinion, not shown, or other suitable gearing on the housing (116) continuously rotates the right turn cylindrical ring (144) in a first direction corresponding to rotation of the output shaft (118) in the right turn direction and the left turn cylindrical ring (146) in a second direction corresponding to rotation of the output shaft (118) in the left turn direction. The speed at which the right and left turn cylindrical rings (144-146) are rotated is calculated to exceed the maximum speed at which the sleeve (130) rotates when the output shaft rotates in either the right or left turn directions.

The steering gear (114) operates generally as described above with respect to steering gears (10,62). Relative rotation between the input and output shafts (126,118) shifts the sleeve (130) in the corresponding direction from its neutral position through the cam and follower apparatus (134). Movement of the sleeve (130) in the direction of the axis (120) shifts the large diameter cylindrical portion (132) more fully into a corresponding one of the right and left turn cylindrical rings (144-146) while withdrawing it from the other. In that circumstance, a magnetic torque is induced on the sleeve in the direction of rotation of the one of the cylindrical rings more fully surrounding the large diameter cylindrical portion (132) which magnetic induced torque is transferred from the sleeve (130) to the output shaft (118) through the spline connection therebetween. The steering gear (114) may afford manufacturing advantages relative to the steering gears (10,62).

I claim:

1. An automotive power steering gear comprising:
   means defining a steering gear housing,
   an input shaft supported on said housing for rotation about a first axis thereof in a right turn direction and in an opposite left turn direction,
   an output shaft supported on said housing for rotation about said first axis independent of said input shaft in said right turn and said left turn directions,
   a spring means between said input and said output shafts biasing said input shaft to a centered position relative to said output shaft,
   a first driving disc means supported on said housing for rotation in one of said right turn and said left turn directions,
   a second driving disc means supported on said housing for rotation in the other of said right and said left turn directions,
   means discs operative to continuously rotate said first and said second driving disc means in respective ones of said right and said left turn directions,
   a driven disc means supported on said housing for rotation and for bodily shiftable movement in opposite directions from a neutral position equally spaced from each of said first and said second driving discs means,
   means drivingly connecting said driven disc means to said output shaft,
   means operative to bodily shift said driven disc means from said neutral position in one of said opposite directions toward one of said first and said second driving discs means when said input shaft is angularly displaced from said centered position relative to said output shaft in one of said right and said left turn directions, and
   means on each of said first and said second driving discs means and on said driven disc means operative to effect a magnetic induced torque on said driven disc means in the direction of rotation of one of said first and said second driving disc means when said driven disc means is bodily shifted from said neutral position toward said one of said first and said second driven discs means.

2. The power steering gear recited in claim 1 wherein
   said spring means between said input and said output shafts biasing said input shaft to a centered position relative to said output shaft includes,
   a torsion bar having a first end rigidly connected to said input shaft and a second end rigidly connected to said output shaft.

3. The power steering gear recited in claim 2 wherein
   said means drivingly connecting said driven disc means to said output shaft includes,
   a sleeve,
   means mounting said sleeve on said output shaft for rotation therewith and for bodily shiftable movement relative thereto in the direction of said first axis, and
   means rigidly connecting said driven disc means to said sleeve.

4. The power steering gear recited in claim 3 wherein
   said means operative to bodily shift said driven disc means toward one of said first and said second driving disc means when said input shaft is angularly displaced from said centered position relative to said output shaft in one of said right and said left turn directions includes,
   means defining a follower on one of said sleeve and on said input shaft, and
   means defining a cam on the other of said sleeve and said input shaft engaged by said follower.

5. The power steering gear recited in claim 4 wherein
   each of said first and said second driving disc means is made of a high energy permanent magnet material, and
   said driven disc means is made of a non-permanently magnetized soft magnetic material.

6. The power steering gear recited in claim 2 wherein
   said means drivingly connecting said driven disc means to said output shaft includes,
   a side shaft mounted on said steering gear housing for rotation about a second axis parallel to said first axis and for bodily shiftable movement in the direction of said second axis,
   means rigidly connecting said driven disc means to said side shaft,
   means defining a first reduction gear on said side shaft, and
   means defining a second reduction gear on said output shaft meshing with said first reduction gear.

7. The power steering gear recited in claim 6 wherein
   said means operative to bodily shift said driven disc means toward one of said first and said second driving disc means when said input shaft is angularly displaced from said centered position relative to said output shaft in one of said right and said left turn directions includes
   a sleeve on said output shaft,
   means connecting said sleeve to said output shaft for rotation as a unit therewith and for bodily shiftable movement relative thereto in the direction of said first axis,
   a cam and follower apparatus on said input shaft and on said sleeve including a follower on one of said sleeve and said input shaft and a cam on the other of said sleeve and said input shaft, and
   arm means connecting said side shaft to said sleeve for bodily shiftable movement in the direction of said second axis as a unit with said sleeve in response to bodily shiftable movement of said sleeve in the direction of said first axis.

8. The power steering gear recited in claim 3 wherein
said driven disc means is defined by a cylindrical large diameter portion of said sleeve, and
each of said first and said second driving disc means is a cylindrical ring disposed around said sleeve at opposite ends of said large diameter portion of said sleeve in said neutral position of said sleeve.

9. The power steering gear recited in claim 8 wherein
each of said first and said second driving disc means is made of a high energy permanent magnet material, and
said driven disc means is made of a non-permanently magnetized soft magnetic material.

* * * * *